Oct. 10, 1950   J. S. CLARKE ET AL   2,525,207
IGNITION TORCH FOR INTERNAL-COMBUSTION PRIME MOVERS
Filed Feb. 24, 1948
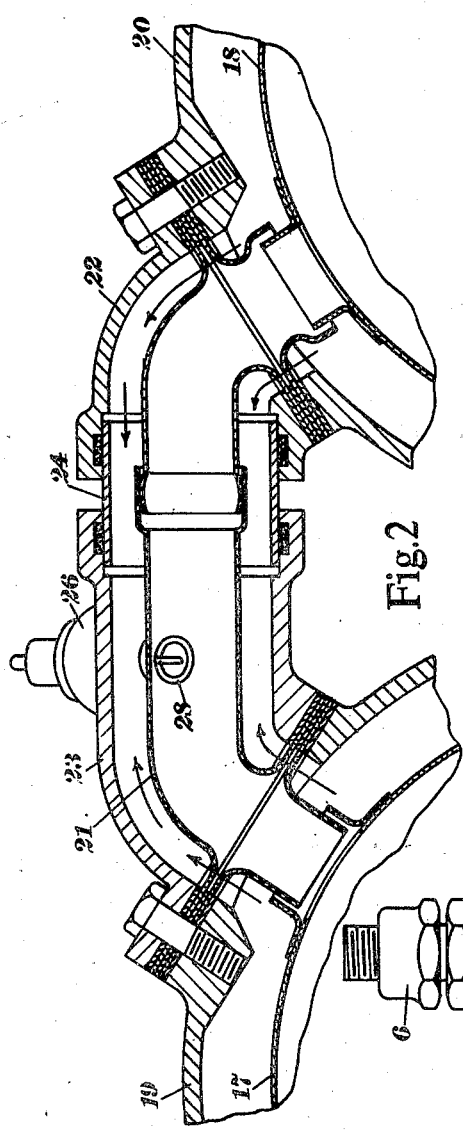
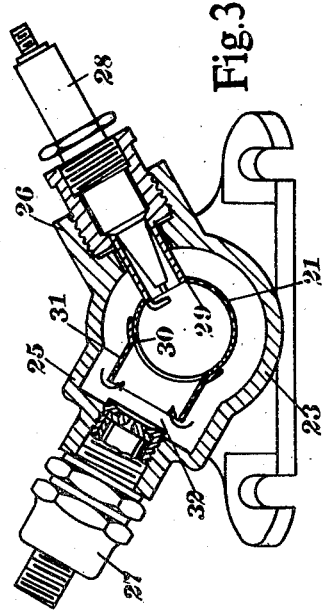
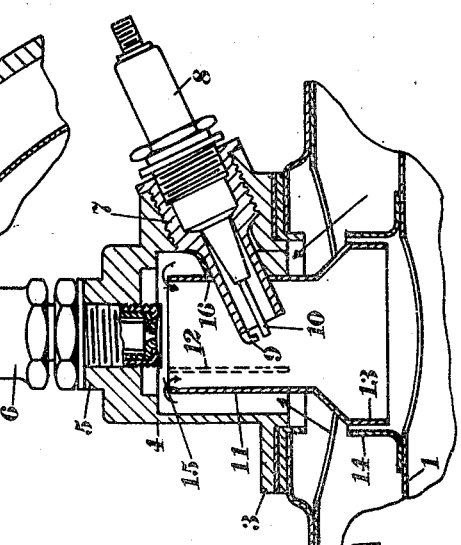
Inventors
J. S. Clarke
A. Huyton Patented Oct. 10, 1950

2,525,207

UNITED STATES PATENT OFFICE 2,525,207

IGNITION TORCH FOR INTERNAL-COMBUSTION PRIME MOVERS

John Stanley Clarke and Alfred Huyton, Burnley, England, assignors to Joseph Lucas Limited, Birmingham, England Application February 24, 1948, Serial No. 10,236 In Great Britain January 13, 1947

Section 1, Public Law 690, August 8, 1946 Patent expires January 13, 1967

1 Claim. (Cl. 60—44)

This invention has for its object to provide an improved ignition torch for use in igniting a combustible mixture of liquid fuel and air in a combustion chamber associated with a turbine or jet-propulsion prime mover, the said chamber being surrounded by an air jacket for carrying a stream of air which is used for completing combustion and/or for diluting the products of combustion.

In the accompanying drawing:

Figure 1 is a sectional elevation of a liquid fuel spraying nozzle and associated ignition torch mounted on the combustion chamber of an internal combustion prime mover and constructed in accordance with the invention;

Figure 2 is a sectional side elevation of the air jacketted balancing pipe connecting the combustion chambers of a pair of prime movers and showing an ignition torch mounted on the balancing pipe in accordance with the invention;

Figure 3 is a cross-section of the balancing pipe showing a liquid fuel spraying nozzle and ignition torch constructed in accordance with the invention.

In carrying the invention into effect according to one convenient mode as illustrated in Figure 1, the main combustion chamber 1 of an internal combustion prime mover of the turbine or jet propulsion type has an air jacket 2, and mounted on the exterior of the air jacket by means of a flange 3 is a hollow body part 4 of generally cylindrical form. The outer end of the hollow body part is formed with a socket 5 for the reception of a liquid fuel spraying nozzle 6. At one side of the hollow body part 4 and inclined to the axis thereof is formed an internally threaded socket 7 within which is screwed a sparking plug 8 having electrodes 9 and 10. Within the body part 4 is formed or secured a hollow concentric cylindrical part 11 between which and the inner surface of the part 4 is arranged an annular space, the two parts being connected together by radial fins 12 extending across the said space. The cylindrical part 11 extends beyond the inner end of the part 4 and is formed with a bell mouth 13 which is adapted to lie within a boss 14 surrounding an aperture in the main combustion chamber. With this arrangement the end of the cylindrical member 11 which communicates with the combustion chamber is of substantially larger diameter than that portion which lies within the body part 4. There is no need for the bell mouth 13 to fit the boss 14 tightly, and these parts may be such as to provide between them an annular space through which air from the jacket 2 can flow into the combustion chamber 1. In an alternative arrangement the end of the cylindrical member 11 may fit over the boss 14 on the combustion chamber. The opposite end of the cylindrical part 11 is arranged to provide a space 15 through which air can flow into the said cylindrical member at a region adjacent to the spraying nozzle 6. The cylindrical part 11 is also apertured at 16 to admit the end of the sparking plug 8. The arrangement described is referred to as a torch and this may be understood as comprising the parts attached to the body part 11.

The arrangement is such that when in use air can flow as indicated by the arrows into the torch from the air jacket of the main combustion chamber of the prime mover. This air mixes with the oil fuel sprayed through the nozzle into the inner part, or combustion chamber, of the torch, where the mixture can be ignited by a spark at the sparking plug. The flame thus produced passes through the open end of the torch into the main combustion chamber for the ignition of the combustible mixture therein.

In the above described arrangement the torch is adapted to be mounted on one side of an air-jacketted combustion chamber of the prime mover. When a number of such combustion chambers are arranged parallel with each other, and are interconnected by transverse air-jacketted balancing pipes, a torch may be adapted to be mounted on one or more of these pipes, in which case the constructional details of the torch may be suitably modified.

Referring to Figures 2 and 3, a pair of main combustion chambers 17 and 18 having air jackets 19 and 20 are connected by a balancing pipe 21 having a jacketted pipe composed of two portions 22 and 23, the latter also constituting the body portion of the ignition torch. The two portions may be connected by a suitable joint 24. The pipe portion 23 is formed with a pair of radially extending sockets 25 and 26 arranged in V relation, the socket 25 being adapted to receive a fuel spraying nozzle 27 and the socket 26 being adapted to receive a sparking plug 28. The balancing pipe 21 which interconnects the main combustion chambers has formed in it a pair of holes opposite the sockets 25 and 26, one of these holes 29 being adapted to receive the end of the sparking plug 28. The other hole 30 has secured over it a short tube 31 which extends into the nozzle socket 25 and forms the torch combustion chamber. The length of this tube 31 is such as to leave an air space 32 between the end of the tube and the end wall of the socket 25, and there is also provided an air space surrounding this tube. As in the previously described example, the air required by the torch passes as indicated by the arrows from the jacket to the region of the nozzle, and the flame produced by ignition of the mixture in the torch combustion chamber passes into the inner part of the balancing pipe where it can effect ignition of the mixture in the adjacent main combustion chambers.

By this invention there is provided in a simple manner an ignition torch which is effective in use even under very rapid conditions of flow of the mixture in the main combustion chamber or chambers, and which is also capable of maintaining combustion in such chamber or chambers when used on craft flying at a high altitude.

Having thus described our invention what we claim as new and desire to secure by Letters Patent is:

In a prime mover combustion system, the combination with a main combustion chamber, and an air jacket surrounding said combustion chamber, of an ignition fitting comprising a hollow body part attached to and extending laterally from the exterior of said jacket so that air from said jacket can enter said body part, a pair of sockets on said body part, a liquid fuel nozzle mounted in one of said sockets with its delivery end situated in said body part, an electric ignition device mounted in the other of said sockets and extending into the interior of said body part, and a torch chamber mounted within said body part with its interior exposed to said ignition device, one end of said torch chamber being in communication with said combustion chamber, and the opposite end being situated adjacent to the delivery end of said nozzle so that fuel issuing from said nozzle, and air entering said body part from said jacket, are admitted to the last mentioned end of said torch chamber.

JOHN STANLEY CLARKE.
ALFRED HUYTON.

REFERENCES CITED

The following references are of record in the file of this patent:

UNITED STATES PATENTS

| Number | Name | Date |
| --- | --- | --- |
| 2,090,039 | Goddard | Aug. 17, 1937 |
| 2,274,573 | Ziegler | Feb. 24, 1942 |
| 2,404,335 | Whittle | July 16, 1946 |
| 2,446,059 | Peterson et al. | July 27, 1948 |